US011152961B2

(12) United States Patent
Uejima (10) Patent No.: US 11,152,961 B2
(45) Date of Patent: Oct. 19, 2021

(54) RADIO FREQUENCY MODULE AND COMMUNICATION DEVICE

(71) Applicant: MURATA MANUFACTURING CO., LTD., Nagaokakyo (JP)

(72) Inventor: Takanori Uejima, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/083,426

(22) Filed: Oct. 29, 2020

(65) Prior Publication Data

US 2021/0152195 A1 May 20, 2021

(30) Foreign Application Priority Data

Nov. 14, 2019 (JP) .............................. JP2019-206093

(51) Int. Cl.
*H04B 1/00* (2006.01)
(52) U.S. Cl.
CPC .................................. *H04B 1/0067* (2013.01)
(58) Field of Classification Search
CPC .......... H04B 1/0067; H04B 1/38; H04B 1/40; H04B 1/401; H04B 1/44
See application file for complete search history.

(56) References Cited

U.S. PATENT DOCUMENTS

2017/0149469 A1\* 5/2017 Kitajima ................ H05K 1/025
2018/0091187 A1\* 3/2018 Uejima ................ H04B 1/0057

FOREIGN PATENT DOCUMENTS

JP 2017-17691 A 1/2017

\* cited by examiner

*Primary Examiner* — Nguyen T Vo
(74) *Attorney, Agent, or Firm* — Xsensus LLP (57) ABSTRACT

A radio frequency module includes: a module board including first and second principal surfaces; a first transfer circuit that transfers a radio frequency signal of a low band group; a second transfer circuit that transfers a radio frequency signal of a middle band group; and a third transfer circuit that transfers a radio frequency signal of a high band group. The first transfer circuit includes: a first filter having the low band group as a passband; and a first circuit component disposed on a transmission path of the low band group. The second transfer circuit includes a second filter having the middle band group as a passband. The third transfer circuit includes a third filter having the high band group as a passband. The second filter and the third filter are disposed on the first principal surface, and the first circuit component is disposed on the second principal surface.

20 Claims, 6 Drawing Sheets

RADIO FREQUENCY MODULE AND COMMUNICATION DEVICE

CROSS REFERENCE TO RELATED APPLICATIONS

The present application is based on and claims priority to Japanese Patent Application No. 2019-206093 filed on Nov. 14, 2019. The entire disclosure of the above-identified application, including the specification, drawings and claims is incorporated herein by reference in its entirety.

TECHNICAL FIELD

The present disclosure relates to a radio frequency (RF) module and a communication device.

BACKGROUND

It is required to apply the system of simultaneously using different frequency bands (communication bands) to radio frequency front-end modules that support multi-band technologies and multimode technologies.

Japanese Unexamined Patent Application Publication No. 2017-17691 discloses in FIG. 2B a circuit configuration of an electronic system (a radio frequency front-end module) including a first transfer circuit and a second transfer circuit. More specifically, the first transfer circuit includes: a first power amplifier that amplifies a radio frequency signal of one frequency region (a first frequency band group); a first antenna switch; a first band selection switch disposed on a first signal path that connects the first power amplifier and the first antenna switch; and a plurality of first duplexers connected to the first band selection switch. The second transfer circuit includes: a second power amplifier that amplifies a radio frequency signal of another frequency region (a second frequency band group); a second antenna switch; a second band selection switch disposed on a second signal path that connects the second power amplifier and the second antenna switch; and a plurality of second duplexers connected to the second band selection switch. According to this configuration, it is possible to perform at least one of simultaneously transmitting, simultaneously receiving, or simultaneously transmitting and receiving a radio frequency signal that is transferred through the first transfer circuit and a radio frequency signal that is transferred through the second transfer circuit.

SUMMARY

Technical Problems

However, as recognized by the present inventor, when the electronic system disclosed by Japanese Unexamined Patent Application Publication No. 2017-17691 is included in a single radio frequency module as a small-sized front-end circuit such as a mobile communication device, there arises a problem that the radio frequency signals that are simultaneously transmitted, simultaneously received, or simultaneously transmitted and received interfere with each other, and thus the isolation between the radio frequency signals that are simultaneously transmitted, simultaneously received, or simultaneously transmitted and received deteriorates. In particular, when a first transmission signal of the first transfer circuit and a second reception signal of the second transfer circuit are simultaneously transmitted, simultaneously received, or simultaneously transmitted and received, there are instances where a harmonic of the first transmission signal flows into the reception path of the second transfer circuit, leading to deterioration of the reception sensitivity of the second transfer circuit.

In view of the above-described circumstances, the present disclosure is presented to provide a radio frequency module that, when performing at least one of simultaneously transmitting, simultaneously receiving, or simultaneously transmitting and receiving a plurality of radio frequency signals, reduces deterioration of the isolation between the plurality of radio frequency signals, and a communication device that includes the radio frequency module.

Solutions

In order to provide such a radio frequency module and such a communication device, a radio frequency module according to one aspect of the present disclosure includes: a module board including a first principal surface and a second principal surface on opposite sides of the module board; an input/output terminal; a first transfer circuit configured to transfer a radio frequency signal of a low band group; a second transfer circuit configured to transfer a radio frequency signal of a middle band group, the middle band group being higher than the low band group; and a third transfer circuit configured to transfer a radio frequency signal of a high band group, the high band group being higher than the middle band group. In the radio frequency module, the first transfer circuit includes: a first filter connected to the input/output terminal and having the low band group as a passband; and one or more first circuit components disposed on a first transmission path through which a transmission signal of the low band group is transferred, the second transfer circuit includes a second filter connected to the input/output terminal and having the middle band group as a passband, the third transfer circuit includes a third filter connected to the input/output terminal and having the high band group as a passband, the second filter and the third filter are disposed on the first principal surface, and at least one of the one or more first circuit components is disposed on the second principal surface.

Advantageous Effects

According to the present disclosure, it is possible to provide a radio frequency module and a communication device each of which has a small size and reduces deterioration of the isolation between a plurality of radio frequency signals when the plurality of radio frequency signals are simultaneously transmitted, simultaneously received, or simultaneously transmitted and received.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

The following describes in detail embodiments of the present disclosure. Each of the embodiments described below illustrates a general or specific example. The numerical values, shapes, materials, structural components, the arrangement and connection of the structural components, and so on, illustrated in the following embodiments, working examples, and variations are mere examples, and therefore do not limit the present disclosure. Among the structural components in the following working examples and variations, structural components not recited in the independent claims are described as arbitrary structural components. In addition, the sizes of structural components and the ratios of the sizes in the drawings are not necessarily strictly illustrated. In each of the diagrams, substantially the same structural components are denoted by the same reference signs, and redundant description may be omitted or simplified.

In addition, in the following description, terms indicating relationships between components such as parallel and vertical and terms indicating the shapes of components such as a quadrilateral shape, and numerical ranges do not represent only the strict meanings but include also a substantially equivalent range, such as a difference of approximately several percent.

In addition, in the following description, in an example of A, B, and C being mounted on a board, "in a plan view of the board (or the principal surface of the board), C is disposed between A and B" means that a straight line connecting an arbitrary point in A and an arbitrary point in B passes through a region in C in a plan view of the board. Furthermore, a plan view of the board means that the board and circuit elements mounted on the board are orthographically projected on a plane parallel to the board.

In addition, in the following description, a "transmission path" refers to a transfer path including a line along which a radio frequency transmission signal propagates, an electrode directly connected to the line, a terminal directly connected to the line or the electrode, etc. Furthermore, a "reception path" refers to a transfer path including a line along which a radio frequency reception signal propagates, an electrode directly connected to the line, a terminal directly connected to the line or the electrode, etc.

In addition, in the following description, "A and B are connected to each other" is applied to not only the case where A and B are physically connected to each other but also the case where A and B are electrically connected to each other. Furthermore, as used herein the terms "circuit" or "circuitry" means one or more circuits, including discrete circuit(s) as well as circuit board(s) and combinations thereof.

Embodiment

1. Circuit Configuration of Radio Frequency Module 1 and Communication Device 5

Figure 1:
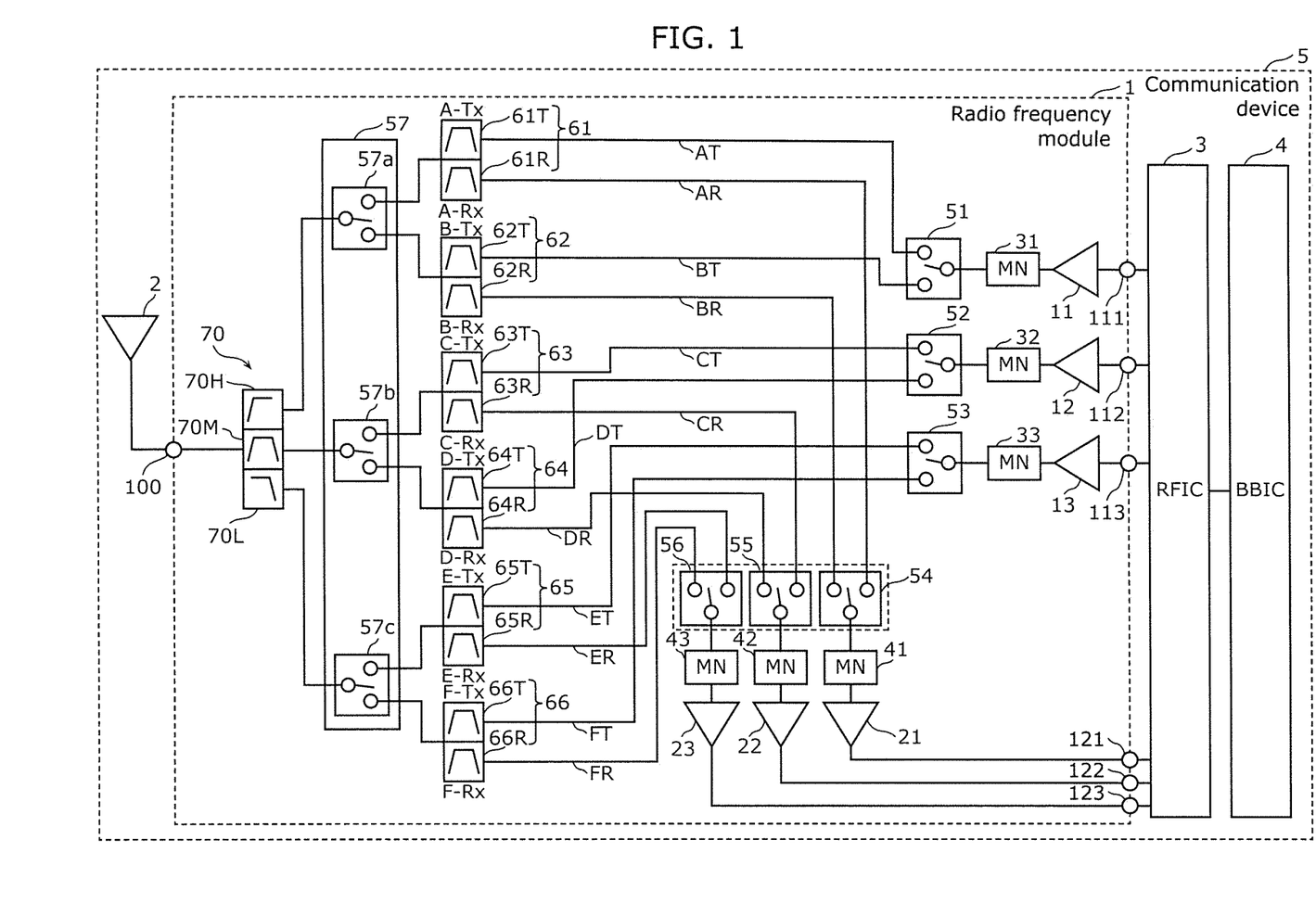
FIG. 1 is a diagram illustrating a circuit configuration of a radio frequency module (or RF front-end circuitry) and a communication device according to an embodiment.

FIG. 1 is a diagram illustrating a circuit configuration of radio frequency module 1 and communication device 5 according to an embodiment. As illustrated in this diagram, communication device 5 includes radio frequency module 1, antenna 2, RF signal processing circuit (RFIC) 3, and baseband signal processing circuit (BBIC) 4. In this exemplary configuration, the communication device is a multi-band transceiver. As used in this specification the term "module", as used with "radio frequency module", or "RF front-end module" should be construed as circuitry (programmable, as well as discrete) and associated circuit components, such as circuit boards, RF shielding, etc.

RFIC 3 is an RF signal processing circuit that processes a radio frequency signal to be transmitted by antenna 2 and a radio frequency signal received by antenna 2. More specifically, RFIC 3 performs signal processing, by down-conversion or the like, on a radio frequency reception signal input via the reception signal path of radio frequency module 1, and outputs the reception signal generated by the signal processing to BBIC 4. In addition, RFIC 3 performs signal processing, by up-conversion or the like, on a transmission signal input from BBIC 4, and outputs the radio frequency transmission signal generated by the signal processing to the transmission signal path of radio frequency module 1.

BBIC 4 is a circuit that performs signal processing using an intermediate frequency band having a lower frequency than a frequency band of a radio frequency signal that is transferred through radio frequency module 1. The signal processed by BBIC 4 is, for example, used as an image signal for image display or as a sound signal for telephone conversation via a speaker.

RFIC 3 also functions as a controller that controls the connection of switches 51, 52, 53, 54, 55, 56, and 57 included in radio frequency module 1, based on a communication band (frequency band) used. More specifically, RFIC 3 controllably switches connection between switches 51 to 57 included in radio frequency module 1, by a control signal (not illustrated). It should be noted that the controller may be disposed outside RFIC 3, and may be disposed, for example, in radio frequency module 1 or BBIC 4. Moreover, in one example the controller is a remote computer, or a distributed computer system that communicates with radio frequency module 1 via a wireless or wired connection. Likewise, in another example, the controller is a local controller with a user interface that converts input signals into control commands that control communication device 5 as well as subcomponents, such as RF module 1.

Antenna 2 is connected to antenna connection terminal 100 of radio frequency module 1, and emits a radio frequency signal that has been output from radio frequency module 1. In addition, antenna 2 receives a radio frequency signal from the outside, and outputs the received radio frequency signal to radio frequency module 1.

It should be noted that, in communication device 5 according to the present embodiment, antenna 2 and BBIC 4 are not indispensable components.

Next, a detailed configuration of radio frequency module 1 will be described.

As illustrated in FIG. 1, radio frequency module 1 includes: transmission power amplifiers 11, 12, and 13; reception low noise amplifiers 21, 22, and 23; transmission filters 61T, 62T, 63T, 64T, 65T, and 66T; reception filters 61R, 62R, 63R, 64R, 65R, and 66R; matching circuits 31, 32, 33, 41, 42, and 43; switches 51, 52, 53, 54, 55, 56, and 57; triplexer 70; antenna connection terminal 100; transmission input terminals 111, 112, and 113; and reception output terminals 121, 122, and 123.

Antenna connection terminal 100 is one example of an input/output terminal. Antenna connection terminal 100 is connected to antenna 2.

Transmission power amplifier 11 is a third transmission power amplifier that amplifies transmission signals of communication band A and communication band B that belong to a high band group. Transmission power amplifier 11 includes an input terminal connected to transmission input terminal 111, and an output terminal connected to matching circuit 31. Transmission power amplifier 12 is a second transmission power amplifier that amplifies transmission signals of communication band C and communication band D that belong to a middle band group including frequencies lower than frequencies of the high band group. Transmission power amplifier 12 includes an input terminal connected to transmission input terminal 112, and an output terminal connected to matching circuit 32. Transmission power amplifier 13 is a first transmission power amplifier that amplifies transmission signals of communication band E and communication band F that belong to a low band group including frequencies lower than frequencies of the middle band group. Transmission power amplifier 13 includes an input terminal connected to transmission input terminal 113, and an output terminal connected to matching circuit 33.

The low band group is a frequency band group including a plurality of communication bands that correspond to 4G and 5G, and has, for example, a frequency range less than or equal to 1 GHz. For communication bands E and F of the low band group, for example, communication bands such as long term evolution (LTE) Band 5 (transmission band: 824 MHz to 849 MHz, reception band: 869 MHz to 894 MHz), LTE Band 8 (transmission band: 880 MHz to 915 MHz, reception band: 925 MHz to 960 MHz), and LTE Band 28 (transmission band: 703 MHz to 748 MHz, reception band: 753 MHz to 803 MHz) are applied.

The middle band group is a frequency band group including a plurality of communication bands that correspond to 4G and 5G, and has, for example, a frequency range from 1.5 GHz to 2.2 GHz. For communication bands C and D of the middle band group, for example, communication bands such as LTE Band 1 (transmission band: 1920 MHz to 1980 MHz, reception band: 2110 MHz to 2170 MHz), LTE Band 39 (transmission/reception band: 1880 MHz to 1920 MHz), and LTE Band 66 (transmission band: 1710 MHz to 1780 MHz, reception band: 2110 MHz to 2200 MHz) are applied.

The high band group is a frequency band group including a plurality of communication bands that correspond to 4G and 5G, and has, for example, a frequency range from 2.4 GHz to 2.8 GHz. For communication bands A and B of the high band group, for example, communication bands such as LTE Band 7 (transmission band: 2500 MHz to 2570 MHz, reception band: 2620 MHz to 2690 MHz), and LTE Band 41 (transmission/reception band: 2496 MHz to 2690 MHz), are applied.

Reception low noise amplifier 21 is a third reception low noise amplifier that amplifies, with low noise, reception signals of communication band A and communication band B that belong to the high band group. Reception low noise amplifier 21 includes an input terminal connected to matching circuit 41, and an output terminal connected to reception output terminal 121. Reception low noise amplifier 22 is a second reception low noise amplifier that amplifies, with low noise, reception signals of communication band C and communication band D that belong to the middle band group. Reception low noise amplifier 22 includes an input terminal connected to matching circuit 42, and an output terminal connected to reception output terminal 122. Reception low noise amplifier 23 is a first reception low noise amplifier that amplifies, with low noise, reception signals of communication band E and communication band F that belong to the low band group. Reception low noise amplifier 23 includes an input terminal connected to matching circuit 43, and an output terminal connected to reception output terminal 123.

Triplexer 70 is one example of a multiplexer, and includes filters 70H, 70M and 70L. Filter 70L is one example of a first filter. Filter 70L is connected to antenna connection terminal 100, and has, as a passband, at least a portion of the low band group. Filter 70M is one example of a second filter. Filter 70M is connected to antenna connection terminal 100, and has, as a passband, at least a portion of the middle band group. Filter 70H is one example of a third filter. Filter 70H is connected to antenna connection terminal 100, and has, as a passband, at least a portion of the high band group. In other words, one of the terminals of filter 70L, one of the terminals of filter 70M, and one of the terminals of filter 70H are commonly connected to antenna connection terminal 100. Each of filters 70L, 70M, and 70H is an LC filter including, for example, at least one of a chip inductor or a chip capacitor. It should be noted that filter 70L may be a low-pass filter and filter 70H may be a high-pass filter.

Transmission filter 61T is disposed on transmission path AT connecting transmission input terminal 111 and the other of the terminals of filter 70H, and passes a transmission signal in a transmission band of communication band A, among the transmission signals that have been amplified by transmission power amplifier 11. Transmission filter 62T is disposed on transmission path BT connecting transmission input terminal 111 and the other of the terminals of filter 70H, and passes a transmission signal in a transmission band of communication band B, among the transmission signals that have been amplified by transmission power amplifier 11. It should be noted that transmission paths AT and BT are each one example of the third transmission path for transferring a transmission signal of the high band group.

Transmission filter 63T is disposed on transmission path CT connecting transmission input terminal 112 and the other of the terminals of filter 70M, and passes a transmission signal in a transmission band of communication band C, among the transmission signals that have been amplified by transmission power amplifier 12. Transmission filter 64T is disposed on transmission path DT connecting transmission input terminal 112 and the other of the terminals of filter 70M, and passes a transmission signal in a transmission band of communication band D, among the transmission signals that have been amplified by transmission power amplifier 12. It should be noted that transmission paths CT and DT are each one example of the second transmission path for transferring a transmission signal of the middle band group.

Transmission filter 65T is disposed on transmission path ET connecting transmission input terminal 113 and the other of the terminals of filter 70L, and passes a transmission signal in a transmission band of communication band E, among the transmission signals that have been amplified by transmission power amplifier 13. Transmission filter 66T is disposed on transmission path FT connecting transmission input terminal 113 and the other of the terminals of filter 70L, and passes a transmission signal in a transmission band of communication band F, among the transmission signals that have been amplified by transmission power amplifier 13. It should be noted that transmission paths ET and FT are each one example of the first transmission path for transferring a transmission signal of the low band group.

Reception filter 61R is disposed on reception path AR connecting the other of the terminals of filter 70H and reception output terminal 121, and passes a reception signal in a reception band of communication band A, among the reception signals that have been input from antenna connection terminal 100. Reception filter 62R is disposed on reception path BR connecting the other of the terminals of filter 70H and reception output terminal 121, and passes a reception signal in a reception band of communication band B, among the reception signals that have been input from antenna connection terminal 100. It should be noted that reception paths AR and BR are each one example of the third reception path for transferring a reception signal of the high band group.

Reception filter 63R is disposed on reception path CR connecting the other of the terminals of filter 70M and reception output terminal 122, and passes a reception signal in a reception band of communication band C, among the reception signals that have been input from antenna connection terminal 100. Reception filter 64R is disposed on reception path DR connecting the other of the terminals of filter 70M and reception output terminal 122, and passes a reception signal in a reception band of communication band D, among the reception signals that have been input from antenna connection terminal 100. It should be noted that reception paths CR and DR are each one example of the second reception path for transferring a reception signal of the middle band group.

Reception filter 65R is disposed on reception path ER connecting the other of the terminals of filter 70L and reception output terminal 123, and passes a reception signal in a reception band of communication band E, among the reception signals that have been input from antenna connection terminal 100. Reception filter 66R is disposed on reception path FR connecting the other of the terminals of filter 70L and reception output terminal 123, and passes a reception signal in a reception band of communication band F, among the reception signals that have been input from antenna connection terminal 100. It should be noted that reception paths ER and FR are each one example of the first reception path for transferring a reception signal of the low band group.

Transmission filter 61T and reception filter 61R are included in duplexer 61 that has, as a passband, communication band A. Transmission filter 62T and reception filter 62R are included in duplexer 62 that has, as a passband, communication band B. Transmission filter 63T and reception filter 63R are included in duplexer 63 that has, as a passband, communication band C. Transmission filter 64T and reception filter 64R are included in duplexer 64 that has, as a passband, communication band D. Transmission filter 65T and reception filter 65R are included in duplexer 65 that has, as a passband, communication band E. Transmission filter 66T and reception filter 66R are included in duplexer 66 that has, as a passband, communication band F.

It should be noted that, in radio frequency module 1 according to the present embodiment, although the transmission filter and the reception filter of each of the communication bands are included in a duplexer for transferring a transmission signal and a reception signal in a frequency division duplex (FDD) system, the transmission signal and the reception signal may be transferred in a time division duplex (TDD) system. In this case, a switch for switching between transmission and reception is disposed on at least one of a preceding stage or a following stage of transmission filter and the reception filter.

It should be noted that the above-described transmission filters 61T to 66T and reception filters 61R to 66R may be, for example, one of a surface acoustic wave filter, an acoustic wave filter using a bulk acoustic wave (BAW), an LC resonant filter, and a dielectric filter, but not limited to these filters.

Matching circuit 31 is disposed on the third transmission path connecting transmission power amplifier 11 and transmission filters 61T and 62T, and matches the impedance of transmission power amplifier 11 with the impedance of transmission filters 61T and 62T. Matching circuit 32 is disposed on the second transmission path connecting transmission power amplifier 12 and transmission filters 63T and 64T, and matches the impedance of transmission power amplifier 12 with the impedance of transmission filters 63T and 64T. Matching circuit 33 is disposed on the first transmission path connecting transmission power amplifier 13 and transmission filters 65T and 66T, and matches the impedance of transmission power amplifier 13 with the impedance of transmission filters 65T and 66T.

Matching circuit 41 is disposed on the third reception path connecting reception low noise amplifier 21 and reception filters 61R and 62R, and matches the impedance of reception low noise amplifier 21 with the impedance of reception filters 61R and 62R. Matching circuit 42 is disposed on the second reception path connecting reception low noise amplifier 22 and reception filters 63R and 64R, and matches the impedance of reception low noise amplifier 22 with the impedance of reception filters 63R and 64R. Matching circuit 43 is disposed on the first reception path connecting reception low noise amplifier 23 and reception filters 65R and 66R, and matches the impedance of reception low noise amplifier 23 with the impedance of reception filters 65R and 66R.

Switch 51 is disposed on the third transmission path connecting matching circuit 31 and transmission filters 61T and 62T. Switch 51 switches between connecting transmission power amplifier 11 to transmission filter 61T and connecting transmission power amplifier 11 to transmission filter 62T. Switch 51 is, for example, a single pole double throw (SPDT) switching circuit which includes a common terminal connected to matching circuit 31, one of selection terminals connected to transmission filter 61T, and the other of the selection terminals connected to transmission filter 62T.

Switch 52 is disposed on the second transmission path connecting matching circuit 32 and transmission filters 63T and 64T. Switch 52 switches between connecting transmission power amplifier 12 to transmission filter 63T and connecting transmission power amplifier 12 to transmission filter 64T. Switch 52 is, for example, an SPDT switching circuit which includes a common terminal connected to matching circuit 32, one of selection terminals connected to transmission filter 63T, and the other of the selection terminals connected to transmission filter 64T.

Switch 53 is disposed on the first transmission path connecting matching circuit 33 and transmission filters 65T and 66T. Switch 53 switches between connecting transmission power amplifier 13 to transmission filter 65T and connecting transmission power amplifier 13 to transmission filter 66T. Switch 53 is, for example, an SPDT switching circuit which includes a common terminal connected to matching circuit 33, one of selection terminals connected to transmission filter 65T, and the other of the selection terminals connected to transmission filter 66T.

Switch 54 is disposed on the third reception path connecting matching circuit 41 and reception filters 61R and 62R. Switch 54 switches between connecting reception low noise amplifier 21 to reception filter 61R and connecting reception low noise amplifier 21 to reception filter 62R. Switch 54 is, for example, an SPDT switching circuit which includes a common terminal connected to matching circuit 41, one of selection terminals connected to reception filter 61R, and the other of the selection terminals connected to reception filter 62R.

Switch 55 is disposed on the second reception path connecting matching circuit 42 and reception filters 63R and 64R. Switch 55 switches between connecting reception low noise amplifier 22 to reception filter 63R and connecting reception low noise amplifier 22 to reception filter 64R. Switch 55 is, for example, an SPDT switching circuit which includes a common terminal connected to matching circuit 42, one of selection terminals connected to reception filter 63R, and the other of the selection terminals connected to reception filter 64R.

Switch 56 is disposed on the first reception path connecting matching circuit 43 and reception filters 65R and 66R. Switch 56 switches between connecting reception low noise amplifier 23 to reception filter 65R and connecting reception low noise amplifier 23 to reception filter 66R. Switch 56 is, for example, an SPDT switching circuit which includes a common terminal connected to matching circuit 43, one of selection terminals connected to reception filter 65R, and the other of the selection terminals connected to reception filter 66R.

Switch 57 includes switches 57a, 57b, and 57c. Switch 57 is one example of an antenna switch disposed on a signal path connecting antenna connection terminal 100 to duplexers 61 to 66. Switch 57 switches connection of antenna connection terminal 100 between duplexers 61 to 66. It should be noted that switch 57 includes a multiple-connection switching circuit capable of simultaneously performing the connection of antenna connection terminal 100 to two or more of the duplexers.

It should be noted that a matching circuit may be disposed between switch 57 and duplexers 61 to 66.

Transmission power amplifiers 11 to 13 and reception low noise amplifiers 21 to 23 include, for example, a field-effect transistor (FET), a hetero-junction bipolar transistor (HBT), etc. which include a Si complementary metal oxide semiconductor (CMOS) or GaAs as a material.

In addition, reception low noise amplifiers 21 to 23 and switches 54 to 57 may be included in a single semiconductor integrated circuit (IC). Furthermore, the above-described semiconductor IC may further include transmission power amplifiers 11 to 13 and switches 51 to 53. The semiconductor IC includes a CMOS, for example. More specifically, the semiconductor IC is fabricated by silicon on insulator (SOI) processing. This allows manufacturing the semiconductor IC at low cost. It should be noted that the semiconductor IC may include at least one of GaAs, SiGe, or GaN. With this, it is possible to output a radio frequency signal having a high-quality amplification performance and noise performance.

In the above-described configuration of radio frequency module 1, transmission power amplifier 11, matching circuit 31, switch 51, transmission filters 61T and 62T, and switch 57a are included in a third transmission circuit for outputting a transmission signal of the high band group (communication band A and communication band B) toward antenna connection terminal 100. In addition, transmission power amplifier 12, matching circuit 32, switch 52, and transmission filters 63T and 64T, and switch 57b are included in a second transmission circuit for outputting a radio frequency transmission signal of communication band C and a radio frequency transmission signal of communication band D toward antenna connection terminal 100. In addition, transmission power amplifier 13, matching circuit 33, switch 53, transmission filters 65T and 66T, and switch 57c are included in a first transmission circuit for outputting a transmission signal of the low band group (communication band E and communication band F) toward antenna connection terminal 100.

Reception low noise amplifier 21, matching circuit 41, switch 54, reception filters 61R and 62R, and switch 57a are included in a third reception circuit for inputting a reception signal of the high band group (communication band A and communication band B) from antenna 2 via antenna connection terminal 100. In addition, reception low noise amplifier 22, matching circuit 42, switch 55, reception filters 63R and 64R, and switch 57b are included in a second reception circuit for inputting a reception signal of the middle band group (communication band C and communication band D) from antenna 2 via antenna connection terminal 100. In addition, reception low noise amplifier 23, matching circuit 43, switch 56, reception filters 65R and 66R, and switch 57c are included in the first reception circuit for inputting a reception signal of the low band group (communication band E and communication band F) from antenna 2 via antenna connection terminal 100.

The first transmission circuit and the first reception circuit are included in the first transfer circuit that transfers a radio frequency signal of the low band group. The second transmission circuit and the second reception circuit are included in the second transfer circuit that transfers a radio frequency signal of the middle band group. The third transmission circuit and the third reception circuit are included in the third transfer circuit that transfers a radio frequency signal of the high band group.

According to the above-described circuit configuration, radio frequency module 1 according to the present embodiment is capable of performing at least one of simultaneously transmitting, simultaneously receiving, or simultaneously transmitting and receiving at least two of a radio frequency signal of the low band group, a radio frequency signal of the middle band group, or a radio frequency signal of the high band group.

It should be noted that, the radio frequency module according to the present disclosure may be implemented without connecting the transmission circuit and the reception circuit to antenna connection terminal 100 via switch 57, and the above-described transmission circuit and the above-described reception circuit may be connected to antenna 2 via different terminals. In addition, as a circuit configuration of the radio frequency module according to the present disclosure, it is sufficient if the radio frequency module includes at least triplexer 70, transmission power amplifier 13 and transmission filter 65T of the low band group, the second reception path of the middle band group, and the third reception path of the high band group. In this case, switches 51 to 57, transmission filters 61T to 64T, and 66T, matching circuits 31 to 33, and 41 to 43, and reception filters 61R to 66R need not necessarily be included. In addition, in the system of this case, a transmission signal of communication band E of the low band group and at least one of a reception signal of the middle band group or a reception signal of the high band group is at least one of simultaneously transmitted, simultaneously received, or simultaneously transmitted and received.

Here, when the circuit elements included in radio frequency module 1 described above are configured in a single module as a small-sized front-end circuit, for example, there are instances where a harmonic of a transmission signal of the low band group flows into the second reception circuit of the middle band group or the third reception circuit of the high band group, leading to deterioration of the reception sensitivity of the second reception circuit or the third reception circuit. For instance, the case where the frequency of a harmonic of a transmission signal that has been amplified by transmission power amplifier 13 overlaps at least a portion of the frequency range of the middle band group or the high band group can be given as one example. In addition, for instance, the case where a frequency of intermodulation distortion between the transmission signal that has been amplified by transmission power amplifier 13 and another radio frequency signal overlaps at least a portion of the frequency range of the middle band group or the high band group can be given as one example.

In contrast, radio frequency module 1 according to the present embodiment has a configuration that reduces the electromagnetic field coupling between the circuit components included in the first transmission circuit of the low band group and filter 70M having, as a passband, at least a portion of the middle band group and filter 70H having, as a passband, at least a portion of the high band group. The following describes the configuration of radio frequency module 1 according to the present embodiment that reduces the above-described electromagnetic field coupling.

2. Arrangement Configuration of Circuit Elements of Radio Frequency Module 1A According to Working Example 1

Figure 2A:
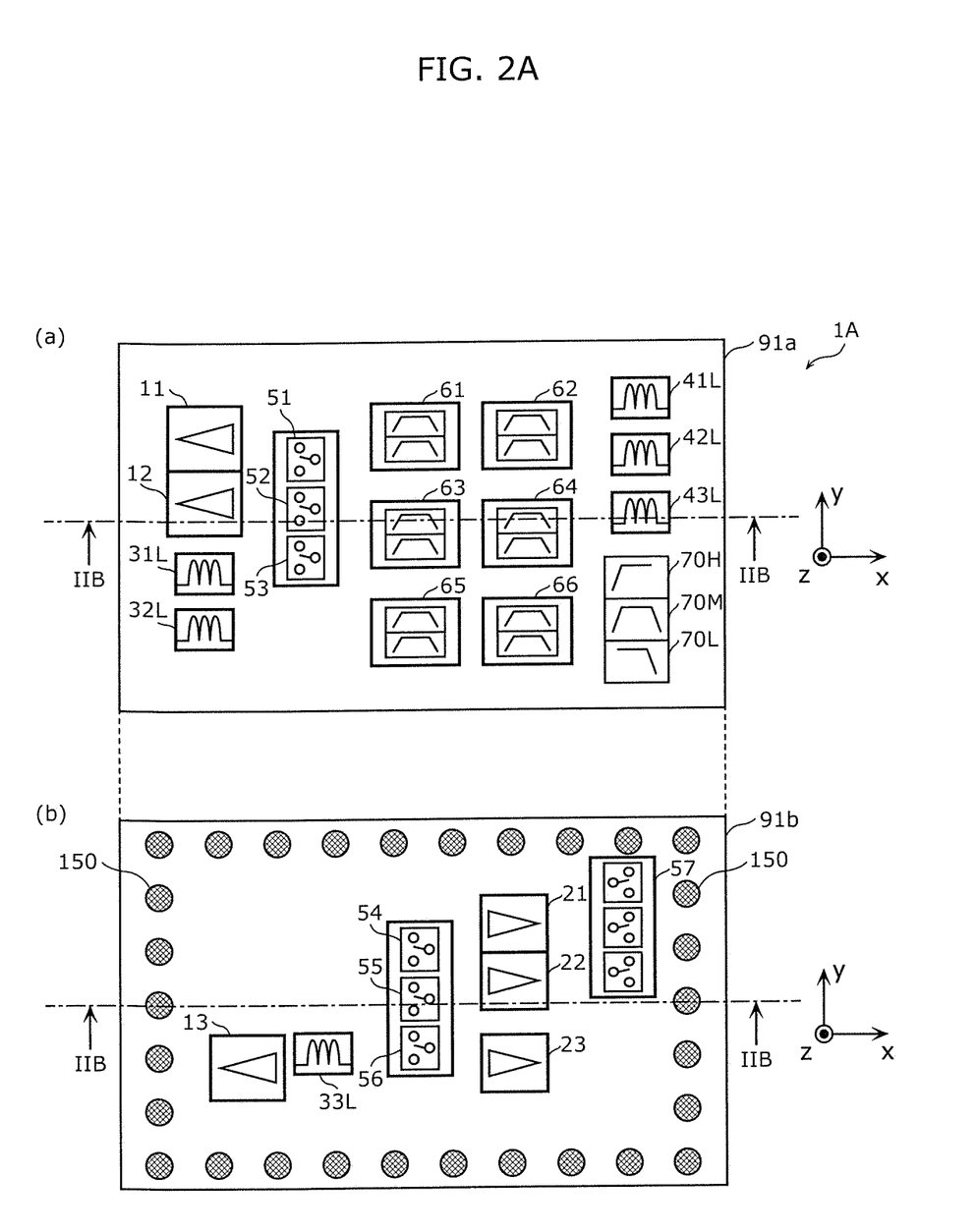
FIG. 2A is a schematic diagram illustrating a plan view configuration of a radio frequency module according to a working example.
Figure 2B:
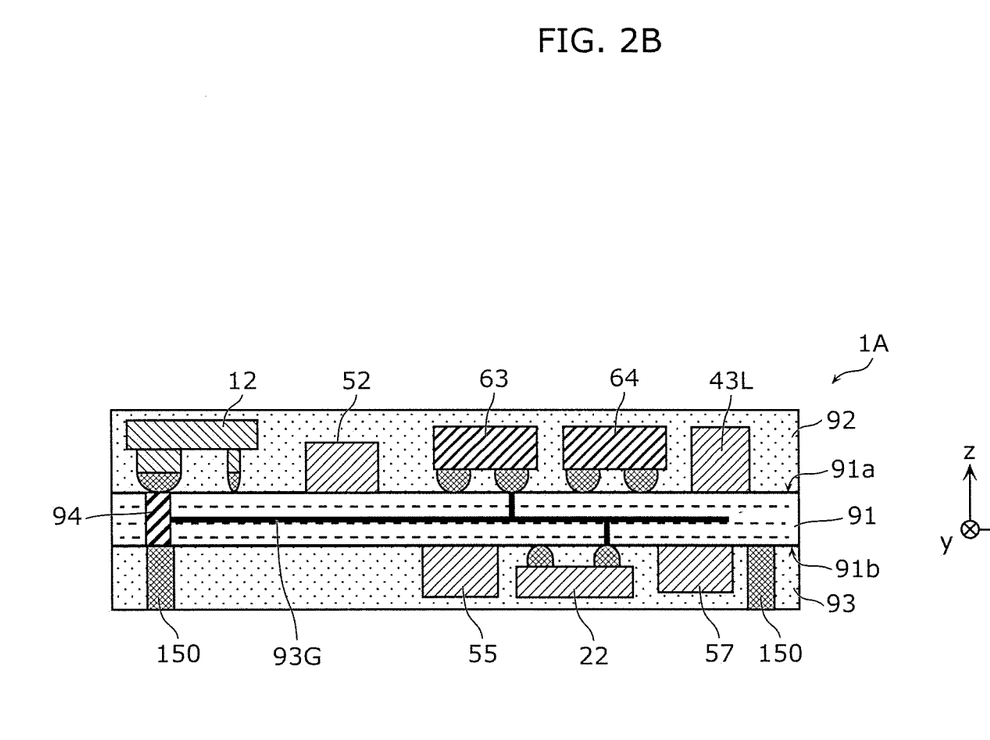
FIG. 2B is a schematic diagram illustrating a cross-sectional configuration of the radio frequency module according to the working example.

FIG. 2A is a schematic diagram illustrating a plan view configuration of radio frequency module 1A according to Working Example 1. FIG. 2B is a schematic diagram illustrating a cross-sectional configuration of radio frequency module 1A according to Working Example 1. More specifically, FIG. 2B is a cross-sectional view taken along line IIB-IIB of FIG. 2A It should be noted that (a) in FIG. 2A illustrates a layout of the circuit elements when, of principal surfaces 91a and 91b located on opposite sides of module board 91, principal surface 91a is viewed from the z-axis positive side. Meanwhile, (b) in FIG. 2A illustrates a perspective view of the layout of the circuit elements when principal surface 91b is viewed from the z-axis positive side.

Radio frequency module 1A according to Working Example 1 specifically illustrates the arrangement configuration of the respective circuit elements included in radio frequency module 1 according to the embodiment.

As illustrated in FIG. 2A and FIG. 2B, radio frequency module 1A according to the present working example further includes module board 91 and resin components 92 and 93 in addition to the circuit configuration illustrated in FIG. 1.

Module board 91 includes principal surface 91a (the first principal surface) and principal surface 91b (the second principal surface) on opposite sides thereof, on which the first transfer circuit that transfers a radio frequency signal of the low band group, the second transfer circuit that transfers a radio frequency signal of the middle band group, and the third transfer circuit that transfers a radio frequency signal of the high band group are mounted. As module board 91, for example, a low temperature co-fired ceramic (LTCC) board having a stacked structure including a plurality of dielectric layers, a high temperature co-fired ceramic (HTCC) board, a component built-in board, a board including a redistribution layer (RDL), or a printed board or the like is used. It should be noted that antenna connection terminal 100, transmission input terminals 111 to 113, and reception output terminals 121 to 123 may be disposed on module board 91.

Resin component 92 is disposed on principal surface 91a of module board 91, and covers a portion of the first to third transfer circuits and principal surface 91a of module board 91. Resin component 92 has a function of ensuring reliability such as mechanical strength and moisture resistance of the circuit elements included in the first to third transfer circuits. Resin component 93 is disposed on principal surface 91b of module board 91, and covers a portion of the first to third transfer circuits and principal surface 91b of module board 91. Resin component 93 has a function of ensuring reliability such as mechanical strength and moisture resistance of the circuit elements included in the first to third transfer circuits. It should be noted that resin components 92 and 93 are not indispensable components for the radio frequency module according to the present disclosure.

It should be noted that matching circuit 31 includes at least inductor 31L. In addition, matching circuit 32 includes at least inductor 32L. In addition, matching circuit 33 includes at least inductor 33L. In addition, matching circuit 41 includes at least inductor 41L. In addition, matching circuit 42 includes at least inductor 42L. In addition, matching circuit 43 includes at least inductor 43L.

As illustrated in FIG. 2A and FIG. 2B, in radio frequency module 1A according to the present working example, triplexer 70, transmission power amplifiers 11 and 12, duplexers 61 to 66, switches 51 o 53, and inductors 31L, 32L, 41L, 42L, and 43L are surface-mounted on principal surface 91a of module board 91. Meanwhile, transmission power amplifier 13, inductor 33L, reception low noise amplifiers 21 to 23, and switches 53 to 57 are surface-mounted on principal surface 91b of module board 91.

Transmission power amplifier 13, inductor 33L, switch 53, duplexers 65 and 66, and switch 57 are the first circuit components disposed on transmission path ET or FT (the first transmission path) that transfers a transmission signal of the low band group.

According to the present working example, among the above-described first circuit components, transmission power amplifier 13, inductor 33L, and switch 57 are mounted on principal surface 91b. Meanwhile, filters 70M, 70H, and 70L included in triplexer 70 are mounted on principal surface 91a.

According to the above-described configuration, filter 70M for the middle band group and filter 70H for the high band group which are included in triplexer 70 are disposed on principal surface 91a of module board 91, and at least one of the first circuit components disposed on the first transmission path for the low band group is disposed on principal surface 91b. In other words, filters 70M and 70H and at least one of the first circuit components are arranged with module board 91 interposed therebetween. According to this configuration, when a high-power transmission signal of the low band group that has been output from transmission power amplifier 13 is transferred through transmission path ET or FT, it is possible to reduce the electric field coupling, the magnetic field coupling, or the electromagnetic field coupling between filters 70M and 70H and the first circuit component disposed on transmission path ET or FT. Accordingly, it is possible to inhibit a harmonic of the transmission signal of the low band group from flowing into reception path AR, BR, CR, or DR without being attenuated by transmission path ET or FT as a result of not passing through at least one of the circuit components disposed on the transmission path ET or FT. In addition, it is possible to inhibit a spurious wave of intermodulation distortion between a transmission signal amplified by transmission power amplifier 13 and a transmission signal amplified by another transmission power amplifier from flowing into reception path AR, BR, CR, or DR. As a result, the isolation between the first transmission circuit, the second reception circuit, and the third reception circuit is improved, and thus it is possible to inhibit a harmonic of a transmission signal of the low band group and a spurious wave of the intermodulation distortion from flowing into the reception circuit of the middle band group or the high band group to decrease the reception sensitivity.

In addition, in radio frequency module 1 according to the present working example, a footprint of transmission power amplifier 13, inductor 33L, and switch 57 disposed on principal surface 91b do not overlap a footprint of filters 70M and 70H disposed on principal surface 91a in a plan view of module board 91.

In other words, in addition to filters 70M and 70H and at least one of the first circuit components being arranged with module board 91 interposed therebetween, it is possible to ensure a large distance from transmission power amplifier 13, inductor 33L, and switch 57 to filters 70M and 70H disposed on principal surface 91a. According to this configuration, when a high-power transmission signal of the low band group that has been output from transmission power amplifier 13 is transferred through transmission path ET or FT, it is possible to further reduce the electric field coupling, the magnetic field coupling, or the electromagnetic field coupling between filters 70M and 70H and the first circuit component disposed on transmission path ET or FT.

In addition, in radio frequency module 1 according to the present working example, it is desirable that a conductive component be disposed between at least one of the first circuit components and filters 70M and 70H in a plan view of module board 91. According to the present working example, duplexers 63 to 66, switch 56, and reception low noise amplifier 23 are disposed between (i) transmission power amplifier 13 and inductor 33L and (ii) filters 70M and 70H. Duplexers 63 to 66, switch 56, and reception low noise amplifier 23 are conductive components. It should be noted that, in this Specification, the conductive component refers to an electronic component including a conductive component such as a signal extraction electrode, and is at least one of, for example, a chip resistor, a chip capacitor, a chip inductor, a filter, a switch, or an active element such as an amplifier and a control circuit. According to this configuration, the electromagnetic fields generated in filters 70M and 70H and the first circuit components are shielded by the conductive components, and thus it is possible to further reduce the electric field coupling, the magnetic field coupling, or the electromagnetic field coupling between the first circuit components and filters 70M and 70H.

It should be noted that, it is sufficient if filters 70H and 70M included in triplexer 70 are disposed on principal surface 91a and at least one of the first circuit components listed below is disposed on principal surface 91b in radio frequency module 1 according to the present disclosure. That is, it is sufficient if at least one of the following (1) to (4) is disposed on principal surface 91b as the first circuit component:

(1) transmission power amplifier 13 disposed on transmission paths ET and FT;
(2) inductor 33L connected to the output terminal of transmission power amplifier 13;
(3) switch 53 or 57 (57c) disposed on transmission paths ET and FT; and
(4) transmission filter 65T, transmission filter 66T, duplexer 65, or duplexer 66 which are disposed on transmission path ET or FT between filter 70L and transmission power amplifier 13.

It is desirable that the first circuit components disposed on principal surface 91b be transmission power amplifier 13 as in the present working example. Transmission power amplifier 13 generates a high-power transmission signal of the low band group, and also generates a harmonic due to a non-linear circuit element included therein. In view of this, by ensuring the isolation between transmission power amplifier 13 and filters 70H and 70M, it is possible to effectively reduce a decrease in the reception sensitivity of the middle band group or the high band group.

In addition, it is desirable that the first circuit component disposed on principal surface 91b be inductor 33L as in the present working example. Inductor 33L is a circuit element that is connected to the output terminal of transmission power amplifier 13, and transfers a high-power transmission signal of the low band group. For this reason, when the electric field coupling, the magnetic field coupling, or the electromagnetic field coupling occurs between inductor 33L and an inductor or a capacitor included in filters 70H and 70M, the isolation between a transmission signal of the low band group and a reception signal of the middle band group or the high band group is decreased. In view of this, not only transmission power amplifier 13 but also inductor 33L is disposed on principal surface 91b, and it is thus possible to further ensure the isolation between the transmission circuit of the low band group and filters 70H and 70M. As a result, it is possible to effectively reduce a decrease in the reception sensitivity of the middle band group or the high band group.

It is desirable that module board 91 have a multilayer structure in which a plurality of dielectric layers are stacked, and that at least one of the plurality of dielectric layers include ground electrode pattern 93G formed thereon, as illustrated in FIG. 2B. With this configuration, the electromagnetic field shielding function of module board 91 is improved.

In addition, in radio frequency module 1A according to the present working example, a plurality of external-connection terminals 150 are disposed on principal surface 91b of module board 91. Radio frequency module 1A exchanges electrical signals with a motherboard disposed on the z-axis negative side of radio frequency module 1A via the plurality of external-connection terminals 150. In addition, one or some of the plurality of external-connection terminals 150 are set to the ground potential of the motherboard. Since reception low noise amplifiers 21 to 23 and switches 54 to 57 which are easy to reduce the height are arranged, of principal surfaces 91a and 91b, on principal surface 91b facing the motherboard, it is possible to reduce the height of radio frequency module 1A as a whole. In addition, a plurality of external-connection terminals 150 that are applied as ground electrodes are disposed in the vicinity of reception low noise amplifiers 21 to 23 that significantly affect the reception sensitivity of the reception circuit. As a result, it is possible to reduce deterioration in the reception sensitivity of the reception circuit.

It should be noted that external-connection terminals 150 may be columnar electrodes that penetrate through resin component 93 in the z-axis direction as illustrated in FIG. 2A and FIG. 2B, or bump electrodes formed on principal surface 91b.

Figure 2C:
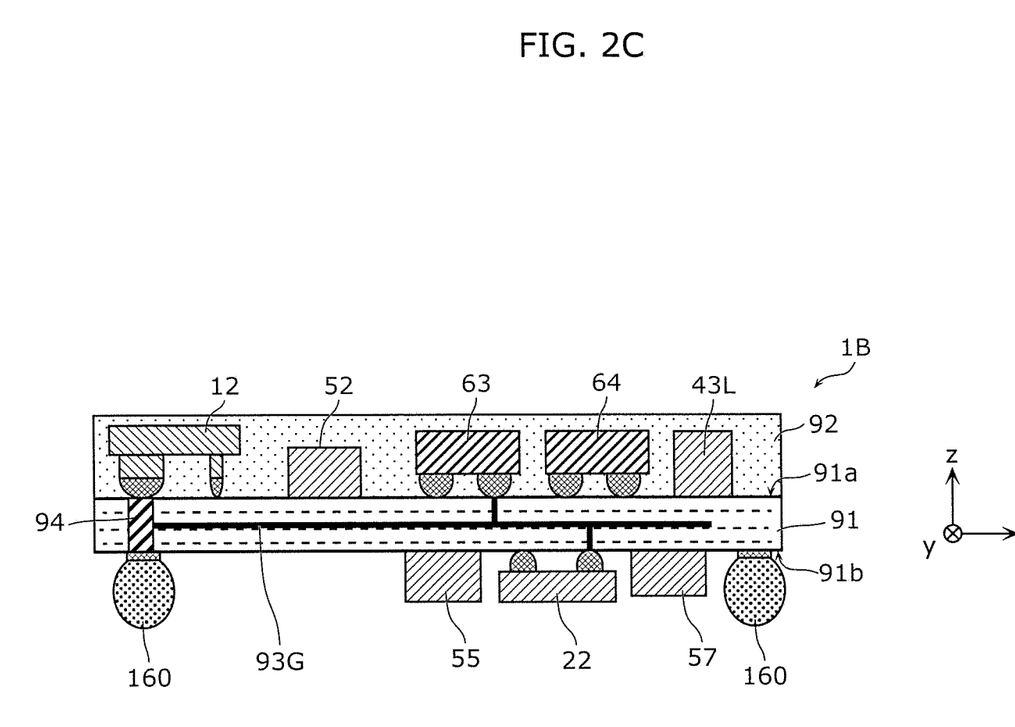
FIG. 2C is a schematic diagram illustrating a plan view configuration of a radio frequency module according to Variation 1.

FIG. 2C is a schematic diagram illustrating a plan view configuration of radio frequency module 1B according to Variation 1. Radio frequency module 1B according to Variation 1 as illustrated in FIG. 2C is different from radio frequency module 1A according to Working Example 1 in that bump electrodes 160 are disposed instead of external-connection terminals 150, and that resin component 93 is not disposed on the principal surface 91b side.

In addition, in radio frequency module 1A according to the present working example, transmission power amplifiers 11 and 12 are mounted on principal surface 91a.

Transmission power amplifiers 11 and 12 are components that generate a large amount of heat among the circuit components included in radio frequency module 1A. In order to improve the heat dissipation property of radio frequency module 1A, it is important to dissipate heat generated by transmission power amplifiers 11 and 12 to the motherboard through a heat dissipation path having a small thermal resistance. If transmission power amplifiers 11 and 12 are mounted on principal surface 91b, the electrode lines connected to transmission power amplifiers 11 and 12 are arranged on principal surface 91b. For that reason, as the heat dissipation path, a heat dissipation path that passes though only a planar line pattern (along the xy plane direction) on principal surface 91b is included. The above-described planar line pattern is formed using a metal thin film, and thus has a large thermal resistance. For that reason, when transmission power amplifiers 11 and 12 are disposed on principal surface 91b, the heat dissipation property is decreased.

In contrast, when transmission power amplifiers 11 and 12 are mounted on principal surface 91a, it is possible to connect transmission power amplifiers 11 and 12 to external-connection terminals 150 via penetrating electrode 94 that penetrates through module board 91 between principal surface 91a and principal surface 91b. As a result, it is possible to exclude a heat dissipation path that passes through only the planar line pattern along the xy plane direction which has a large thermal resistance, from among the lines in module board 91, as the heat dissipation paths for transmission power amplifiers 11 and 12. It is thus possible to provide radio frequency module 1A having an improved heat dissipation property for dissipating heat from transmission power amplifiers 11 and 12 to the motherboard.

In addition, it is desirable that no circuit component be disposed in a region on principal surface 91b across transmission power amplifiers 11 and 12. According to this configuration, it is possible to dispose a heat dissipation component of transmission power amplifiers 11 and 12 in the above-described region on principal surface 91b. Accordingly, the heat dissipation property for dissipating heat from transmission power amplifiers 11 and 12 to the motherboard is further improved.

3. Arrangement Configuration of Circuit Elements of Radio Frequency Module 1C According to Variation 2

Figure 3A:
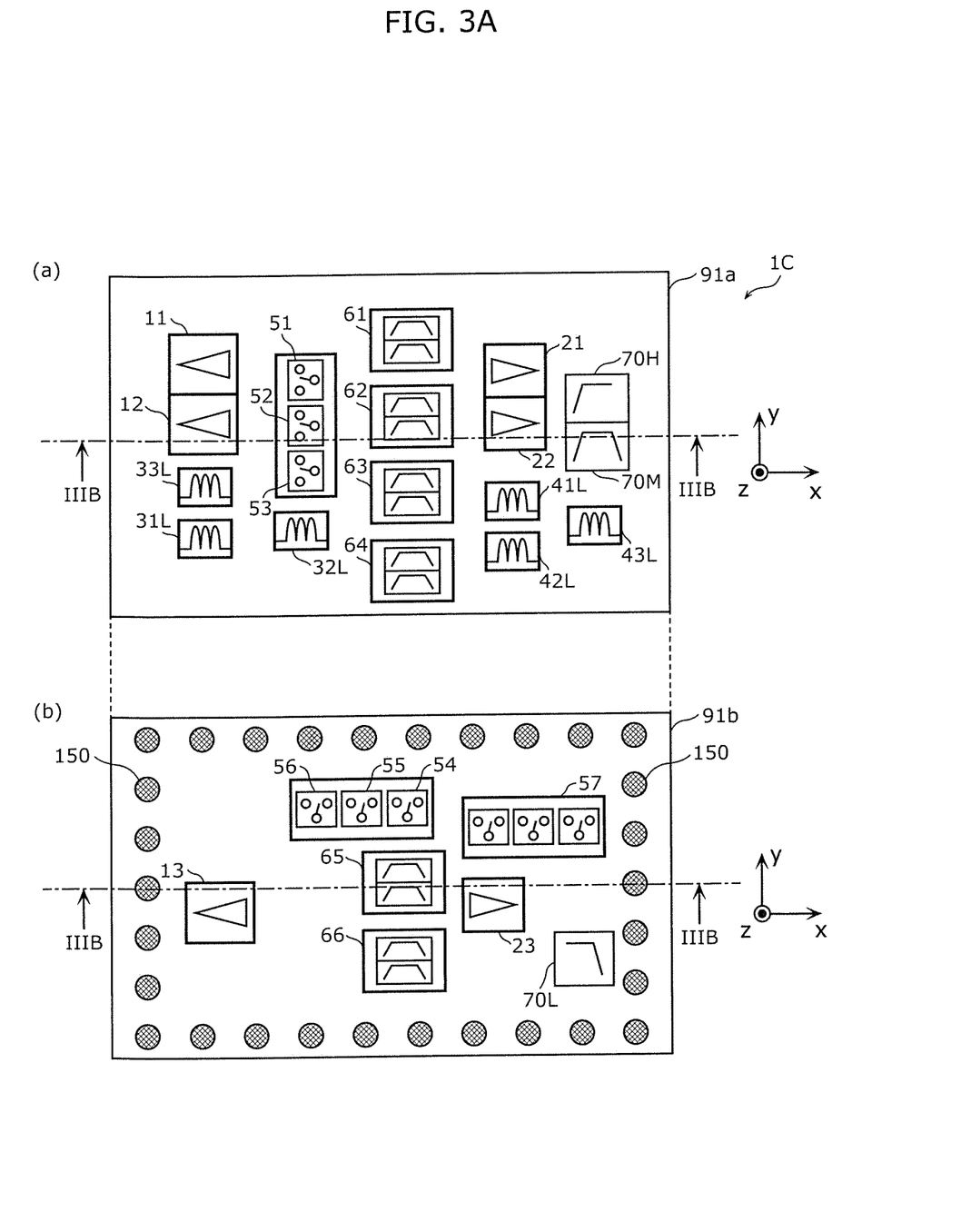
FIG. 3A is a schematic diagram illustrating a plan view configuration of a radio frequency module according to Variation 2.
Figure 3B:
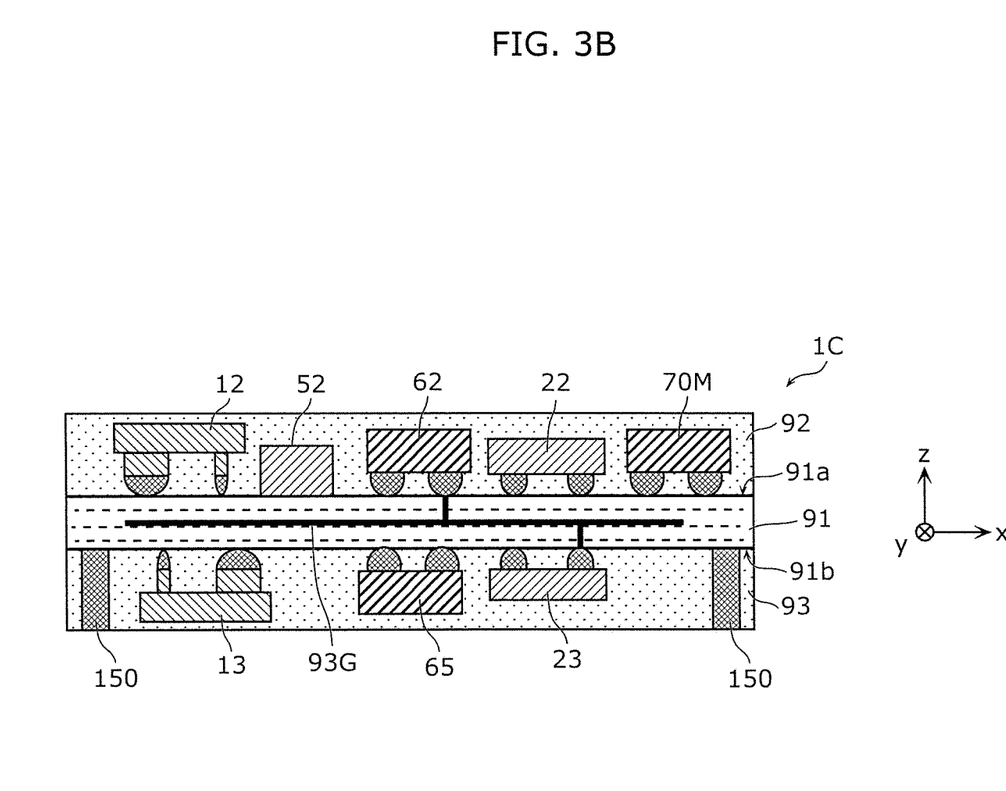
FIG. 3B is a schematic diagram illustrating a cross-sectional configuration of the radio frequency module according to Variation 2.

FIG. 3A is a schematic diagram illustrating a plan view configuration of radio frequency module 1C according to Variation 2. FIG. 3B is a schematic diagram illustrating a cross-sectional configuration of radio frequency module 1C according to Variation 2. More specifically, FIG. 3B is a cross-sectional view taken along line IIIB-IIIB of FIG. 3A. It should be noted that (a) in FIG. 3A illustrates a layout of the circuit elements when, of principal surfaces 91a and 91b located on opposite sides of module board 91, principal surface 91a is viewed from the z-axis positive side. Meanwhile, (b) in FIG. 3A illustrates a perspective view of the layout of the circuit elements when principal surface 91b is viewed from the z-axis positive side.

Radio frequency module 1C according to Variation 2 specifically illustrates the arrangement configuration of the respective circuit elements included in radio frequency module 1 according to the embodiment.

As illustrated in FIG. 3A and FIG. 3B, radio frequency module 1C according to the present variation further includes module board 91 and resin components 92 and 93 in addition to the circuit configuration illustrated in FIG. 1.

Radio frequency module 1C according to the present variation is different from radio frequency module 1A according to Working Example 1 only in the arrangement configuration of the circuit elements included in radio frequency module 1C. Hereinafter, radio frequency module 1C according to the present variation will be described. In the description, the same points as those of radio frequency module 1A according to Working Example 1 will be omitted, and different points will be mainly described.

As illustrated in FIG. 3A and FIG. 3B, in radio frequency module 1C according to the present variation, filters 70H and 70M, transmission power amplifiers 11 and 12, duplexers 61 to 64, switches 51 o 53, inductors 31L, 32L, 33L, 41L, 42L, and 43L, and reception low noise amplifiers 21 and 22 are surface-mounted on principal surface 91a of module board 91. Meanwhile, filter 70L, transmission power amplifier 13, duplexers 65 and 66, reception low noise amplifier 23, and switches 53 to 57 are surface-mounted on principal surface 91b of module board 91.

Transmission power amplifier 13, inductor 33L, switch 53, duplexers 65 and 66, and switch 57 are the first circuit components disposed on transmission path ET or FT (the first transmission path) that transfers a transmission signal of the low band group.

According to the present variation, among the above-described first circuit components, transmission power amplifier 13 and duplexers 65 and 66 are mounted on principal surface 91b. Meanwhile, filters 70M and 70H included in triplexer 70 are mounted on principal surface 91a.

According to the above-described configuration, filter 70M for the middle band group and filter 70H for the high band group which are included in triplexer 70 are disposed on principal surface 91a of module board 91, and at least one of the first circuit components disposed on the first transmission path for the low band group is disposed on principal surface 91b. According to this configuration, when a high-power transmission signal of the low band group that has been output from transmission power amplifier 13 is transferred through transmission path ET or FT, it is possible to reduce the electric field coupling, the magnetic field coupling, or the electromagnetic field coupling between filters 70M and 70H and the first circuit component disposed on transmission path ET or FT. As a result, the isolation between the first transmission circuit, the second reception circuit, and the third reception circuit is improved, and thus it is possible to inhibit a harmonic of a transmission signal of the low band group and a spurious wave of the inter-modulation distortion from flowing into the reception circuit of the middle band group or the high band group to decrease the reception sensitivity.

It should be noted that, in radio frequency module 1C according to the present variation, a footprint of inductor 33L overlaps a footprint of transmission power amplifier 13 in a plan view of module board 91. With this configuration, since inductor 33L and transmission power amplifier 13 face each other across module board 91, it is possible to reduce the length of a line connecting inductor 33L and the output terminal of transmission power amplifier 13. As a result, it is possible to reduce transfer loss in the transmission path.

In addition, in radio frequency module 1C according to the present variation, filter 70L is disposed on principal surface 91b. This configuration improves the isolation between a radio frequency signal of the low band group and a radio frequency signal of the middle band group, and improves the isolation between a radio frequency signal of the low band group and a radio frequency signal of the high band group, in triplexer 70. As a result, it is possible to further inhibit a harmonic of a transmission signal of the low band group and a spurious wave of the intermodulation distortion from flowing into the reception circuit of the middle band group or the high band group to decrease the reception sensitivity.

4. Advantageous Effects, Etc.

As described above, radio frequency module 1 according to the embodiment includes: module board 91 including principal surface 91a and principal surface 91b on opposite sides of module board 91; a first transfer circuit that transfers a radio frequency signal of a low band group; a second transfer circuit that transfers a radio frequency signal of a middle band group, the middle band group being higher than the low band group; and a third transfer circuit that transfers a radio frequency signal of a high band group, the high band group being higher than the middle band group. The first transfer circuit includes: filter 70L connected to antenna connection terminal 100 and having the low band group as a passband; and one or more first circuit components disposed on transmission path ET or FT through which a transmission signal of the low band group is transferred. The second transfer circuit includes filter 70M connected to antenna connection terminal 100 and having the middle band group as a passband. The third transfer circuit includes filter 70H connected to antenna connection terminal 100 and having the high band group as a passband. Filter 70M and filter 70H are disposed on principal surface 91a, and at least one of the one or more first circuit components is disposed on principal surface 91b.

According to the above-described configuration, when a high-power transmission signal of the low band group that has been output from transmission power amplifier 13 is transferred through transmission path ET or FT, it is possible to reduce the electric field coupling, the magnetic field coupling, or the electromagnetic field coupling between filters 70M and 70H and the one or more first circuit components disposed on transmission path ET or FT. Accordingly, it is possible to inhibit a harmonic of the transmission signal of the low band group from flowing into reception path AR, BR, CR, or DR without being attenuated by transmission path ET or FT as a result of not passing through at least one of the one or more first circuit components disposed on the transmission path ET or FT. In addition, it is possible to inhibit a spurious wave of intermodulation distortion between a transmission signal amplified by transmission power amplifier 13 and a transmission signal amplified by another transmission power amplifier from flowing into reception path AR, BR, CR, or DR. As a result, the isolation between the first transmission circuit, the second reception circuit, and the third reception circuit is improved, and thus it is possible to inhibit a harmonic of a transmission signal of the low band group and a spurious wave of intermodulation distortion from flowing into the reception circuit of the middle band group or the high band group to decrease the reception sensitivity.

In addition, filter 70L, filter 70M, and filter 70H may be included in triplexer 70 that multiplexes and demultiplexes radio frequency signals of the low band group, the middle band group, and the high band group.

In addition, it is desirable that, in a plan view of module board 91, a footprint of the at least one of the one or more first circuit components do not overlap with a footprint of filter 70M or filter 70H.

According to the above-described configuration, in addition to the configuration in which filters 70M and 70H and the at least one of the one or more first circuit components are arranged with module board 91 interposed therebetween, it is possible to ensure a large distance from the above-described at least one of the one or more first circuit components disposed on principal surface 91b to filters 70M and 70H disposed on principal surface 91a. As a result, when a high-power transmission signal of the low band group is transferred through transmission path ET or FT, it is possible to further reduce the electric field coupling, the magnetic field coupling, or the electromagnetic field coupling between filters 70M and 70H and the at least one of the one or more first circuit components disposed on transmission path ET or FT.

In addition, in a plan view of module board 91, a conductive component may be disposed between the at least one of the one or more first circuit components and filter 70M and between the at least one of the one or more first circuit components and filter 70H.

According to the above-described configuration, it is possible to further reduce the electric field coupling, the magnetic field coupling, or the electromagnetic field coupling between filters 70M and 70H and the above-described at least one of the one or more first circuit components.

In addition, the one or more first circuit components may include at least one of: transmission power amplifier 13 disposed on transmission paths ET and FT; inductor 33L connected to an output terminal of transmission power amplifier 13; switch 53 or 57 (57c) disposed on transmission paths ET and FT; or one of transmission filter 65T, transmission filter 66T, duplexer 65, and duplexer 66 disposed on transmission path ET or FT between filter 70L and transmission power amplifier 13.

In addition, it is desirable that transmission power amplifier 13 be disposed on principal surface 91b.

Transmission power amplifier 13 generates a high-power transmission signal of the low band group, and also generates a harmonic due to a non-linear circuit element included therein. In view of this, by ensuring the isolation between transmission power amplifier 13 and filters 70H and 70M, it is possible to effectively reduce a decrease in the reception sensitivity of the middle band group or the high band group.

In addition, it is desirable that inductor 33L be disposed on principal surface 91b.

Inductor 33L is a circuit element that is connected to the output terminal of transmission power amplifier 13, and transfers a high-power transmission signal of the low band group. For this reason, when the electric field coupling, the magnetic field coupling, or the electromagnetic field coupling occurs between inductor 33L and an inductor or a capacitor included in filters 70H and 70M, the isolation between a transmission signal of the low band group and a reception signal of the middle band group or the high band group is decreased. In view of this, by disposing not only transmission power amplifier 13 but also inductor 33L on principal surface 91b so as to ensure the isolation between the transmission circuit of the low band group and filters 70H and 70M, it is possible to effectively reduce a decrease in the reception sensitivity of the middle band group or the high band group.

In addition, in the same manner as radio frequency module 1C according to Variation 2, inductor 33L may be disposed on principal surface 91a, and inductor 33L and transmission power amplifier 13 may overlap in a plan view of module board 91.

With this configuration, since inductor 33L and transmission power amplifier 13 face each other across module board 91, it is possible to reduce the length of a line connecting inductor 33L and the output terminal of transmission power amplifier 13. As a result, it is possible to reduce transfer loss in the transmission path.

In addition, filter 70L may be disposed on principal surface 91b.

This configuration improves the isolation between a radio frequency signal of the low band group and a radio frequency signal of the middle band group, and improves the isolation between a radio frequency signal of the low band group and a radio frequency signal of the high band group, in triplexer 70.

In addition, external-connection terminal 150 may be disposed on principal surface 91b.

In addition, the second transfer circuit may further include transmission power amplifier 12 that amplifies a transmission signal of the middle band group, the third transfer circuit may further include transmission power amplifier 11 that amplifies a transmission signal of the high band group, and transmission power amplifier 11 and transmission power amplifier 12 may be disposed on principal surface 91a.

Transmission power amplifiers 11 and 12 are components that generate a large amount of heat. When transmission power amplifiers 11 and 12 are mounted on principal surface 91a, it is possible to connect transmission power amplifiers 11 and 12 to external-connection terminals 150 via penetrating electrode 94 that penetrates through module board 91 between principal surface 91a and principal surface 91b. As a result, it is possible to exclude a heat dissipation path that passes through only the planar line pattern along the xy plane direction which has a large thermal resistance, from among the lines in module board 91, as the heat dissipation paths for transmission power amplifiers 11 and 12. It is thus possible to provide radio frequency module 1 having an improved heat dissipation property for dissipating heat from transmission power amplifiers 11 and 12 to the motherboard.

In addition, the first transfer circuit may further include reception low noise amplifier 23 that amplifies a reception signal of the low band group, the second transfer circuit may further include reception low noise amplifier 22 that amplifies a reception signal of the middle band group, the third transfer circuit may further include reception low noise amplifier 21 that amplifies a reception signal of the high band group, and reception low noise amplifier 21, reception low noise amplifier 22, and reception low noise amplifier 23 may be disposed on principal surface 91b.

According to the-above described configuration, since reception low noise amplifiers 21 to 23 which are easy to reduce the height are arranged on, of principal surface 91a and principal surface 91b, principal surface 91b facing the motherboard, it is possible to reduce the height of radio frequency module 1 as a whole. In addition, one or some of the plurality of external-connection terminals 150 are set to the ground potential of the motherboard. Accordingly, a plurality of external-connection terminals 150 that are applied as ground electrodes are disposed in the vicinity of reception low noise amplifiers 21 to 23 that significantly affect the reception sensitivity of the reception circuit. As a result, it is possible to reduce deterioration in the reception sensitivity of the reception circuit.

In addition, communication device 5 includes: RFIC 3 that processes a radio frequency signal to be transmitted by antenna 2 and a radio frequency signal received by antenna 2; and radio frequency module 1 that transfers the radio frequency signals between antenna 2 and RFIC 3.

According to the above-described configuration, it is possible to provide communication device 5 that has a small size and reduces deterioration of the isolation between a plurality of radio frequency signals when the plurality of radio frequency signals are simultaneously transmitted, simultaneously received, or simultaneously transmitted and received.

Other Embodiments, Etc.

Although the radio frequency module and the communication device according to the embodiment of the present disclosure have been described above based on the working examples and variations, the radio frequency module and the communication device according to the present disclosure are not limited to the foregoing working examples, and variations. The present disclosure also encompasses: other embodiments achieved by combining arbitrary structural components in the above-described working examples and variations; variations resulting from various modifications to the above-described working examples and variations that may be conceived by those skilled in the art without departing from the essence of the present disclosure; and various devices that include the above-described radio frequency module and the communication device.

For example, in the radio frequency module and the communication device according to the foregoing working examples and the variations, another circuit element and line, for example, may be inserted in a path connecting circuit elements and a signal path which are disclosed in the drawings.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable widely to communication apparatuses such as mobile phones as a radio frequency module disposed in a multiband-compatible front-end unit.

The invention claimed is:
1. A radio frequency module, comprising:
a module board including a first principal surface and a second principal surface on opposite sides of the module board;
an input/output terminal;
a first transfer circuit configured to transfer a radio frequency signal of a low band group;
a second transfer circuit configured to transfer a radio frequency signal of a middle band group, the middle band group being higher than the low band group; and a third transfer circuit configured to transfer a radio frequency signal of a high band group, the high band group being higher than the middle band group, wherein the first transfer circuit includes:
a first filter connected to the input/output terminal and having the low band group as a passband; and
one or more first circuit components disposed on a first transmission path through which a transmission signal of the low band group is transferred,
the second transfer circuit includes a second filter connected to the input/output terminal and having the middle band group as a passband,
the third transfer circuit includes a third filter connected to the input/output terminal and having the high band group as a passband,
the second filter and the third filter are disposed on the first principal surface, and
at least one of the one or more first circuit components is disposed on the second principal surface.

2. The radio frequency module of claim 1, wherein the first filter, the second filter, and the third filter are included in a multiplexer configured to multiplex and demultiplex radio frequency signals of the low band group, the middle band group, and the high band group.

3. The radio frequency module of claim 1, wherein in a plan view of the module board, a footprint of the at least one of the one or more first circuit components does not overlap a footprint of the second filter or the third filter.

4. The radio frequency module of claim 3, wherein in a plan view of the module board, a conductive component is disposed between the at least one of the one or more first circuit components and the second filter and between the at least one of the one or more first circuit components and the third filter.

5. The radio frequency module of claim 1, wherein the one or more first circuit components include a first transmission power amplifier disposed on the first transmission path.

6. The radio frequency module of claim 5, wherein the one or more first circuit components include a first inductor connected to an output terminal of the first transmission power amplifier.

7. The radio frequency module of claim 6, wherein the first inductor is disposed on the second principal surface.

8. The radio frequency module of claim 6, wherein the first inductor is disposed on the first principal surface.

9. The radio frequency module of claim 8, wherein a footprint of the first inductor overlaps a footprint of the first transmission power amplifier in a plan view of the module board.

10. The radio frequency module of claim 5, wherein the one or more first circuit components include one of a transmission filter and a duplexer disposed on the first transmission path between the first filter and the first transmission power amplifier.

11. The radio frequency module of claim 5, wherein the first transmission power amplifier is disposed on the second principal surface.

12. The radio frequency module of claim 1, wherein the one or more first circuit components include a switch disposed on the first transmission path.

13. The radio frequency module of claim 1, wherein the first filter is disposed on the second principal surface.

14. The radio frequency module of claim 1, wherein an external-connection terminal is disposed on the second principal surface.

15. The radio frequency module according to claim 1, wherein
the second transfer circuit includes a second transmission power amplifier configured to amplify a transmission signal of the middle band group,
the third transfer circuit includes a third transmission power amplifier configured to amplify a transmission signal of the high band group, and
the second transmission power amplifier and the third transmission power amplifier are disposed on the first principal surface.

16. The radio frequency module according to claim 1, wherein
the first transfer circuit includes a first reception low noise amplifier configured to amplify a reception signal of the low band group,
the second transfer circuit includes a second reception low noise amplifier configured to amplify a reception signal of the middle band group,
the third transfer circuit includes a third reception low noise amplifier configured to amplify a reception signal of the high band group, and
the first reception low noise amplifier, the second reception low noise amplifier, and the third reception low noise amplifier are disposed on the second principal surface.

17. A communication device, comprising:
a radio frequency (RF) signal processing circuit configured to process a radio frequency signal to be transmitted by an antenna and a radio frequency signal received by the antenna; and
a radio frequency module configured to transfer the radio frequency signals between the antenna and the RF signal processing circuit, wherein
the radio frequency module comprises
a module board including a first principal surface and a second principal surface on opposite sides of the module board;
an input/output terminal;
a first transfer circuit configured to transfer a radio frequency signal of a low band group;
a second transfer circuit configured to transfer a radio frequency signal of a middle band group, the middle band group being higher than the low band group; and
a third transfer circuit configured to transfer a radio frequency signal of a high band group, the high band group being higher than the middle band group, wherein
the first transfer circuit includes:
a first filter connected to the input/output terminal and having the low band group as a passband; and
one or more first circuit components disposed on a first transmission path through which a transmission signal of the low band group is transferred,
the second transfer circuit includes a second filter connected to the input/output terminal and having the middle band group as a passband,
the third transfer circuit includes a third filter connected to the input/output terminal and having the high band group as a passband, the second filter and the third filter are disposed on the first principal surface, and at least one of the one or more first circuit components is disposed on the second principal surface.

18. A radio frequency module, comprising:
a module board including a first principal surface and a second principal surface on opposite sides of the module board;
an input/output terminal;
a first transfer circuit configured to transfer a radio frequency signal of a first band group;
a second transfer circuit configured to transfer a radio frequency signal of a second band group, the second band group being different from the first band group; and
a third transfer circuit configured to transfer a radio frequency signal of a third band group, the third band group being different from the first band group and the second band group, wherein
the first transfer circuit includes one or more first circuit components disposed on a first transmission path through which a transmission signal of the first band group is transferred, the second transfer circuit includes a second filter connected to the input/output terminal and having the second band group as a passband, the third transfer circuit includes a third filter connected to the input/output terminal and having the third band group as a passband, the second filter and the third filter are disposed on the first principal surface, and at least one of the one or more first circuit components is disposed on the second principal surface.

19. The radio frequency module of claim 18, wherein
in a plan view of the module board, a footprint of the at least one of the one or more first circuit components does not overlap a footprint of the second filter or the third filter.

20. The radio frequency module of claim 19, wherein
in a plan view of the module board, a conductive component is disposed between the at least one of the one or more first circuit components and the third filter.

* * * * *